United States Patent [19]

Conciatori et al.

[11] 3,969,325

[45] July 13, 1976

[54] PRODUCTION OF PARTICULATE BBB TYPE POLYMER HAVING AN UNUSUALLY HIGH SURFACE AREA

[75] Inventors: Anthony B. Conciatori, Chatham; Rufus S. Jones, Jr., Dover, both of N.J.

[73] Assignee: Celanese Corporation, New York, N.Y.

[22] Filed: Dec. 14, 1973

[21] Appl. No.: 424,996

[52] U.S. Cl. .................................. 260/78.41
[51] Int. Cl.$^2$ ................ C08G 69/28; C08G 69/32
[58] Field of Search ......................... 260/78.4 R

[56] References Cited
UNITED STATES PATENTS

| | | | |
|---|---|---|---|
| 3,784,517 | 1/1974 | Hedberg et al. | 260/78.4 R |
| 3,804,804 | 4/1974 | Gerber et al. | 260/78.4 R |

*Primary Examiner*—Joseph L. Schofer
*Assistant Examiner*—Maria S. Tungo

[57] ABSTRACT

An improved process is provided for the formation of BBB type polymer, i.e. poly(bisbenzimidazobenzophenanthroline) and related nitrogenous polymers, in finely divided form having an unusually high surface area. The condensation reaction of at least one organic tetra-amine and at least one tetracarboxylic acid (which optionally may be in the form of the corresponding half anhydride or dianhydride) is conducted at an elevated temperature with agitation in the presence of a major concentration of a liquid sulfone (e.g. diphenyl sulfone) which is inert under the reaction conditions. The resulting particulate product of BBB type polymer commonly exhibits a surface area of about 100 to 500, or more, square meters per gram, and may be used in the formation of pressure molded articles of high temperature resistance.

16 Claims, No Drawings

PRODUCTION OF PARTICULATE BBB TYPE POLYMER HAVING AN UNUSUALLY HIGH SURFACE AREA

BACKGROUND OF THE INVENTION

In recent years considerable attention has been focused upon the development of polymers having high temperature resistance. Such polymers are useful, for instance, in the fabrication of articles including reentry parachutes for space vehicles, and high temperature insulating materials, etc.

BBB type polymers, and particularly poly(bisbenzimidazobenzophenanthroline), are recognized to be useful in the formation of extremely attractive products which are capable of withstanding highly elevated temperatures. These polymers heretofore commonly have been formed in a phosphoric acid medium as reported in commonly assigned U.S. Pat. Nos. 3,539,677 and 3,574,170. Alternatively, these polymers may be formed in a molten Lewis acid solvent as reported in commonly assigned U.S. Ser. Nos. 221,780, filed Jan. 28, 1972 (now abandoned), and 229,178, filed Feb. 24, 1972 (now U.S. Pat. No. 3,798,201). While reference to the possible use of an organic solvent generally has been alluded to in the literature, no organic solvent is believed to have been heretofore proposed which offers the advantages of the present process.

It is an object of the present invention to provide an improved process for the formation of BBB type polymer.

It is an object of the present invention to provide an improved process for the formation of particulate BBB type polymer having an unusually high surface area.

It is an object of the present invention to provide an improved process for the formation of BBB type polymer which may be conducted at a relatively high condensation temperature for a relatively brief reaction time.

It is an object of the present invention to provide an improved process for the formation of BBB type polymer wherein the quantity of polymer formed within a given reaction zone may be substantially greater than that commonly formed employing prior art techniques.

It is another object of the present invention to provide an improved process for the formation of BBB type polymer which may readily be conducted at a highly elevated temperature at atmospheric pressure.

It is another object of the present invention to provide finely divided BBB type polymer having a high surface area which is particularly suited for pressure molding to form three-dimensional shaped articles.

These and other objects, as well as the scope, nature, and utilization of the invention will be apparent from the following description and appended claims.

SUMMARY OF THE INVENTION

It has been found that in a process for forming a BBB type polymer comprising condensing with intimate admixture:

a. at least one organic tetra-amine having the structural formula

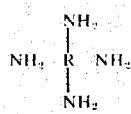

wherein R is an aromatic or cycloaliphatic tetravalent radical and wherein each of the four amino groups is attached directly to a carbon atom present in a ring of the aromatic or cycloaliphatic radical in a position which is ortho or peri to another carbon atom to which another of the amino groups is also directly attached, and b. at least one tetracarboxylic acid or its corresponding half anhydride or dianhydride having the structural formula

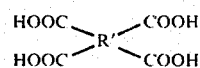

wherein R' is a tetravalent aromatic or cycloaliphatic radical wherein each of the four carboxyl groups is attached directly to a carbon atom present in a ring of the aromatic or cycloaliphatic radical in a position which is ortho or peri to another carbon atom to which another of the carboxyl groups is also directly attached;

improved results are achieved by conducting the condensation with agitation at a temperature of about 300° to 450°C. in the presence of a major concentration of a liquid aryl sulfone which is inert under the reaction conditions, with the BBB type polymer upon formation assuming the configuration of a particulate solid having an unusually high surface area of 100 to 500 square meters per gram and an inherent viscosity of at least 0.2 dl./gram.

DESCRIPTION OF PREFERRED EMBODIMENTS

The present invention generally is applicable to the formation of BBB type polymer, i.e. poly(bisbenzimidazobenzophenanthroline) and related nitrogenous polymers. As is now otherwise known in the art these polymers are made by condensing at least one organic tetra-amine with at least one tetracarboxylic acid (which also may be in the form of the corresponding half anhydride or dianhydride).

THE ORGANIC TETRA-AMINE

The organic tetra-amine has a structural formula

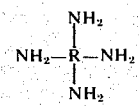

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached. When R is an amino substituted bicyclic ring compound, such as tetra-amino substituted naphthalene, the carbon atoms at the 1 and 8 positions are considered to be peri to each other as are the carbon atoms at the 4 and 5 positions. Five or six member rings are formed depending upon whether R is ortho or peri amino substituted respectively, as will be apparent to those skilled in the art. It is preferred that R be an aromatic radical rather than a cycloaliphatic radical. It is preferred that R contain up to about 20 carbon atoms.

Non-limiting examples of the tetra-amine monomers which may be used individually or in mutual admixture in forming the desired polymers are: 3,3'-diaminobenzidine; bis(3,4-diamino phenyl)methane; 1,2-bis(3,4-diamino phenyl)ethane; 2,2-bis(3,4-diamino phenyl)propane; bis(3,4-diamino phenyl)ether; bis(3,4-diamino phenyl)sulfide; bis(3,4-diamino phenyl)sulfone; 1,2,4,5-tetra-amino benzene; 1,4,5,8-tetra-amino-napthalene; 2,3,6,7-tetra-aminonaphthalene; etc.; and the corresponding ring-hydrogenated tetra-amines.

THE TETRACARBOXYLIC ACID

The tetracarboxylic acid (which also may be in the form of the corresponding half anhydride or dianhydride) has the structural formula

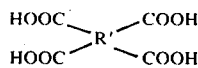

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached. When R' is a carboxyl substituted bicyclic fused ring compound, such as tetra-carboxyl substituted naphthalene, the carbon atoms at the 1 and 8 positions are considered to be peri to each other, as are the carbon atoms at the 4 and 5 positions. Five or six member rings are formed depending upon whether R' is ortho or peri carboxyl substituted respectively, as will be apparent to those skilled in the art. It is preferred that R' be an aromatic radical rather than a cycloaliphatic radical. It is preferred that R' contain up to about 20 carbon atoms.

Non-limiting examples of the tetracarboxylic acids include: pyromellitic acid, i.e. 1,2,4,5-benzenetetracarboxylic acid; 2,3,6,7-naphthalene tetracarboxylic acid; 3,3',4,4'-diphenyl tetracarboxylic acid; 1,4,5,8-naphthalene tetracarboxylic acid; 2,2',3,3'-diphenyl tetracarboxylic acid; 2,2-bis(3,4-dicarboxyphenyl) propane; bis(3,4-dicarboxyphenyl)sulfone; 3,4,9,10-perylene tetracarboxylic acid; bis(3,4-dicarboxyphenyl)ether; ethylene tetracarboxylic acid, naphthalene-1,2,4,5-tetracarboxylic acid; decahydronaphthalene-1,4,5,8-tetracarboxylic acid; 4,8-dimethyl-1,2,3,5,6-hexahydronaphthalene-1,2,5,6-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane-1,2,3,4-tetracarboxylic acid; pyrrolidine-2,3,4,5-tetracarboxylic acid; pyrazine-2,3,5,6-tetracarboxylic acid; 2,2-bis(2,3-dicarboxyphenyl)propane; 1,1-bis(2,3-dicarboxyphenyl)ethane; 1,1-bis(3,4-dicarboxyphenyl)ethane; bis(2,3-dicarboxyphenyl)methane; bis(3,4-dicarboxyphenyl)methane; benzene-1,2,3,4-tetracarboxylic acid; 1,2,3,4-butane tetracarboxylic acid; thiophene-2,3,4,5-tetracarboxylic acid; and similar acids, as well as the half anhydrides (i.e. mono anhydrides) or dianhydrides of such acids. The preferred tetracarboxylic acids contain carboxyl groups peri substituted upon a naphthalene nucleus.

THE POLYMERIZATION MEDIUM

The polymerization medium cmprises a major concentration of a liquid sulfone which is inert under the reaction conditions. The sulfone polymerization medium may possess the structural formula R—SO$_2$—R' wherein R and R' are the same or different aryl, alkyl, or alkoxy group (e.g. —OR" where R" is an alkyl group). Preferably, at least one of the R or R' groups is an aryl group. Alternatively, the sulfone polymerization medium may be cyclic in nature wherein R and R' are linked to form a common ring structure (e.g. O$_2$SR). Also, more than one sulfone group may be present in a given molecule of the polymerization medium. It is essential that the sulfone polymerization medium be free of any substituent groups which would undergo reaction with the condensation reactants or the BBB type polymer product, e.g. amino groups, carboxyl groups, or halogen groups.

The sulfone utilized possesses a relatively high boiling point, and commonly is a solid at ambient conditions. Under the condensation reaction conditions selected the sulfone is a liquid. The sulfone preferably possesses a boiling point in excess of 300°C. (e.g. a boiling point of about 300° to 450°C.), and most preferably a boiling point of about 325° to 420°C. It is preferable that the sulfone polymerization medium inherently be a liquid at the condensation reaction temperature selected (described hereafter) and at substantially atmospheric pressure, otherwise superatmospheric condensation reaction conditions must be utilized.

Representative sulfone polymerization media suitable for use in the present process are as follows: diphenyl sulfone (boiling point about 378° to 379°C.); 4,4'-ditolyl sulfone (boiling point 405°C. at 714 mm. Hg); methylphenyl sulfone; ethylphenyl sulfone; 4,4'-diethoxy sulfone; 1,2-bis(phenylsulfonyl)ethane, etc. The preferred sulfone polymerization media are diphenyl sulfone; 4,4'-ditolyl sulfone; and methylphenyl sulfone.

The particularly preferred sulfone polymerization medium is diphenyl sulfone. In this compound both R and R' are simple phenyl groups. Diphenyl sulfone is an example of a high boiling sulfone which is a solid at room temperature and a liquid at the condensation reaction temperature, and is sometimes identified as phenyl sulfone or sulfobenzide. The melting point of diphenyl sulfone is about 128° to 129°C.

A low boiling organic solvent for the condensation reactants and the sulfone optionally may be initially provided in admixture therewith prior to raising the temperature of the condensation reactants to reaction temperature (described hereafter) with the low boiling organic solvent being substantially volatilized prior to the reactants reaching reaction temperature. The low boiling organic solvent does not undergo any substantial chemical reaction while present in the condensation reaction zone and can be considered inert with respect to the condensation reactants. The low boiling organic solvent possesses a boiling point below about 200°C., e.g. a boiling point of about 80° to 200°C. The boiling point of the low boiling organic solvent should be above the melting point of the sulfone polymerization medium, but sufficiently low to allow for its volatilization prior to reaching polymerization temperature. The low boiling organic solvent serves the role of aiding in the formation of a homogeneous reaction mixture in the shortest possible time. In the absence of the low boiling organic solvent the sulfone polymerization must be heated until molten before a homogeneous admixture can be formed.

Representative low boiling organic solvents which optionally may be utilized include: para-xylene, toluene, ortho-xylene, meta-xylene, methylethyl benzenes, cumene (i.e. isopropyl benzene), cymene, chlorobenzene, anisole, ethoxy benzene, decahydronaphthalene (cis- and trans-), decane, nonane, tetrahydronaphthalene, etc.

Preferred low boiling organic solvents are para-xylene, chlorobenzene, and cumene. The particularly preferred low boiling organic solvent is para-xylene.

THE CONDENSATION REACTION

The condensation reaction wherein the BBB type polymer is formed is conducted while the condensation reactants are agitated in the presence of a major concentration of the liquid sulfone polymerization medium (heretofore described) at a temperature of about 300° to 450°C., e.g. at about 325° to 420°C. The preferred reaction temperature when employing a diphenyl sulfone polymerization medium is about 350° to 380°C. The tetra-amine and the tetracarboxylic acid or its corresponding half anhydride or dianhydride preferably are provided in substantially stoichiometric concentrations. The condensation reactants commonly are provided in a total concentration of about 5 to 25 percent by weight based upon the total weight of the condensation reactants and the sulfone polymerization medium, e.g. in a concentration of about 10 to 20 percent by weight. In a preferred embodiment the condensation reaction is carried out at substantially atmospheric pressure. However, superatmospheric pressures up to about 200 psig alternatively may be employed. It is, of course, understood that the boiling point of the sulfone polymerization medium must not be exceeded during the condensation reaction and accordingly may influence the exact temperature selected for the condensation reaction.

When no low boiling organic solvent is utilized, the condensation reactants and the sulfone polymerization medium may be brought to reaction temperature by slowly heating an intimate admixture of the same until the melting point of the sulfone is reached. The reaction should be stirred continuously to insure even heating.

In the embodiment of the process wherein a low boiling organic solvent is utilized, it commonly is provided in a concentration of about 20 to 70 percent by weight based upon the total weight of the condensation reactants, e.g. in a concentration of about 35 to 65 percent by weight.

When utilizing the low boiling organic solvent in the process, the tetra-amine condensation reactant and the sulfone polymerization medium tend initially to dissolve in the same at room temperature. As the mixture is heated the tetracarboxylic acid or corresponding half anhydride or dianhydride is dissolved. The contents of the reaction zone may be brought to the desired reaction temperature by external heating at a moderately rapid rate, e.g. at about 5° to 15°C./minute. As the boiling point of the low boiling organic solvent is exceeded, it is allowed to volatilize and to be removed from the reaction zone.

The condensation reaction preferably is conducted in the absence of air so that the organic tetra-amine will not be appreciably oxidized by oxygen in a competing reaction.

It is preferred that the molecular weight of the polymer formed be such that its inherent viscosity is at least 0.2 dl./gram (e.g. 0.2 to 3.0 dl./gram), and most preferably about 0.4 to 2.5 dl./gram. The inherent viscosity is measured at 25°C. at a concentration of 0.4 g. of polymer per 100 ml. of solvent. Ninety-seven percent sulfuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and $C$ is the concentration expressed in grams of polymer per 100 ml. of solution. As is known in the polymer art, inherent viscosity is monotonically related to the molecular weight of the polymer.

Commonly, condensation reaction times of about 0.5 to 10 hours are adequate to complete the desired degree of polymerization e.g. about 2.5 to 5 hours. The water by-product may be volatilized as it is formed.

As the condensation reaction progresses, surprisingly it has been found that the product of BBB type polymer assumes the configuration of a particulate solid of extremely small particle size. Such particulate solid begins to appear soon after the reactants reach reaction temperature, and is suspended within the sulfone polymerization medium via agitation as the reaction proceeds. Commonly particulate BBB type polymer is formed in the present process having an unusually high surface area of about 100 to 500, or more, square meters per gram, e.g. about 200 to 350 square meters per gram. The surface area of the resulting product may be determined by any technique commonly utilized in such measurement, such as nitrogen adsorption utilizing the Brunauer-Emmett-Teller adsorption isotherm.

The particulate BBB type polymer of unusually small particle size may be recovered at the completion of the condensation reaction by any convenient technique such as filtration of the mixture above the melting point of the sulfone polymerization medium, or by the addition of solvent capable of dissolving the sulfone polymerization medium and not the polymer product, followed by filtration. It is recommended that the isolated polymer be mixed with suitable solvents to remove remaining traces of the sulfone polymerization medium and/or unreacted monomer, and again isolated by filtration.

If desired, the BBB type polymer optionally may be treated in certain alkaline solutions to remove unstable linkages in accordance with the teachings of commonly assigned U.S. Pat. No. 3,574,171.

FORMATION OF SHAPED ARTICLES

The particulate BBB type polymer formed in accordance with the present process is particularly suited for use in the formation of three dimensional shaped articles of high temperature resistance via pressure molding. For instance, such three dimensional shaped articles simply may be formed while heating a mass of the particulate product to a temperature of about 250° to 500°C. while present in a molding apparatus at a pressure of about 18,000 to 22,000 psi or higher. Other formation techniques alternatively may be utilized such as the coating of a mass of the particulate polymer with a polymerizable monomer, or the mixing of another moldable polymer with the particulate polymer prior to molding.

Alternatively, the resulting BBB type polymer may be utilized to form filamentary materials or films via known spinning or casting techniques. Such products also exhibit high temperature resistance.

As has been previously described in the art, BBB type polymer, and particularly poly(bisbenzimidazobenzophenanthroline), can be formed into filaments by wet-spinning methods, i.e., extruding a solution of the polymer in an appropriate solvent, such as sulfuric acid, through an opening of predetermined shape into a coagulation bath, e.g., a sulfuric acid-water coagulation bath, which results in a filamentary material of the desired cross-section. Polymer solutions may be prepared, for example, by dissolving sufficient polymer in the solvent to yield a final solution suitable for extrusion which contains about 2 to 15 percent by weight, preferably about 3 to 10 percent by weight, of polymer based on the total weight of the solution. It is found that the polymer dissolves most readily on warming to a temperature of between about 50° to 70°C. to produce a viscous solution. The sulfuric acid concentration for the spinning solvent preferably has an equivalent $H_2SO_4$ content of about 92 to 102 percent. The polymeric spinning solution is then extruded into a coagulation bath, i.e., wet spun, to form filaments which may then be washed, dried, and hot drawn and ultimately may optionally be passed through a hot flame or an equivalent high temperature zone as fully described in commonly assigned U.S. Pat. No. 3,523,151.

As has been described in commonly assigned U.S. Pat. No. 3,539,677, while filaments of satisfactory properties can be made from BBB type polymers under a variety of spinning conditions, filaments possessing superior properties can be obtained by maintaining the coagulation bath within certain parameters. For instance, when spinning a BBB type polymer while dissolved in a sulfuric acid solvent and using an aqueous sulfuric acid coagulation bath, it is desirable to maintain such a bath at a temperature between about 45° and 80°C., preferably between 55° and 70°C., and to maintain the sulfuric acid concentration in the bath between about 50 and 80 percent by weight, optimally between about 65 and 75 percent. When operating within these parameters, an as-spun fiber is obtained which is suitable for producing after drawn fibers of superior tensile properties and strength retention suitable for use at the elevated temperatures for which the fibers of the present invention are intended.

After wet spinning, the resulting as-spun fibers may be washed thoroughly in order to remove excess acid and to minimize contamination. They may then be dried and drawn in order to improve their physical characteristics, e.g., tenacity, elongation, thermal resistance, etc. Afterdrawing of the fibers is desirably performed at temperatures between about 500° and 700°C. at a draw ratio from greater than 1:1 to about 4:1 (e.g. 1.1:1 to 4:1) and preferably between 1.5:1 and 2.5:1. Poly(bisbenzimidazobenzophenanthroline) fibers drawn in this manner may have a strength in excess of 3 grams per denier and thermal resistance at temperatures as high as 700° or 800°C.

The following examples are given as specific illustrations of the invention. It should be understood, however, that the invention is not limited to the specific details set forth in the examples. In each example poly(bisbenzimidazobenzophenanthroline) was formed by the condensation of 1,4,5,8-naphthalene tetracarboxylic acid and 3,3'-diamino benzidine to form a fully cyclicized polymer one isomer of which is illustrated in the following equation:

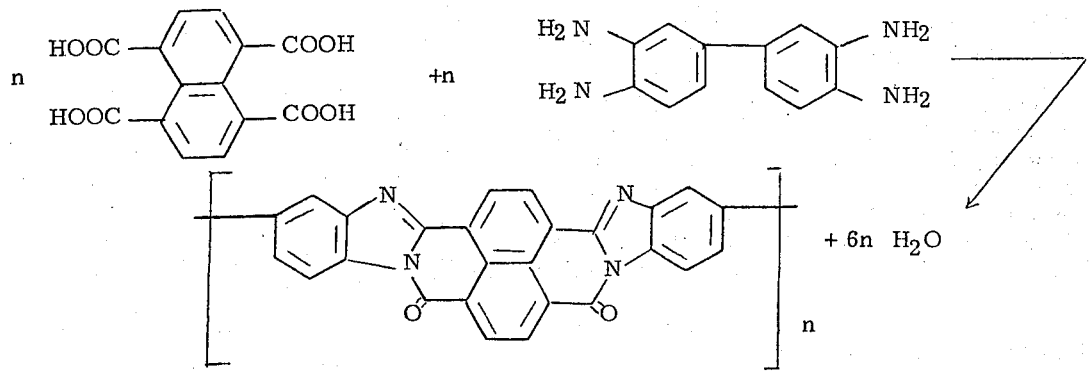

The specific isomer illustrated may be identified as poly[6,9-dihydro-6,9-dioxobisbenzimidazo(2,1-b:1',2'-j)benzo(lmn) (3,8)phenanthroline-2,13-diyl]. It will be apparent to those skilled in the art that various additional isomers will also be produced during the condensation reaction.

EXAMPLE I

Equimolar quantities of 1,4,5,8-naphthalene tetracarboxylic acid (i.e. 10 parts by weight) and 3,3'-diamino benzidine (i.e. 8 parts by weight) together with 100 parts by weight diphenyl sulfone, and 86 parts by weight of para-xylene while at room temperature (i.e. about 25°C.) are charged to a reaction vessel. The reaction vessel is equipped with a paddle stirrer, and a nitrogen purge, and is provided at substantially atmospheric pressure. Agitation of the contents of the reaction vessel continuously is provided by the stirrer.

The 3,3'-diamino benzidine and the diphenyl sulfone immediately dissolve in the para-xylene while the 1,4,5,8-naphthalene tetracarboxylic acid is largely initially suspended therein while in particulate form.

The contents of the reaction vessel are heated at a rate of about 10°C. per minute. The 1,4,5,8-naphthalene tetracarboxylic acid gradually dissolves. At a temperature of about 138°C. the para-xylene is volatilized and substantially removed from the reaction zone. At this temperature the melting point of the diphenyl sulfone has been exceeded and this compound serves as a liquid polymerization reaction medium. When the contents of the reaction vessel reach 375°C. no further heating is accomplished and that temperature is maintained for 3.5 hours. Solid particles of extremely finely divided polymer appear and are suspended in the reaction vessel. The heating of the reaction vessel is terminated and the particulate product is recovered by allowing it to cool to ambient temperature, dissolving the solid diphenyl sulfone polymerization medium in acetone, and removing the particulate solid by filtration.

The product is found to possess an I.V. of 0.79 dl./gram and an extremely high surface area of 290 square meters per gram as determined by BET nitrogen adsorption analysis.

EXAMPLE II

Example I is repeated with the exception that no para-xylene is introduced into the reaction vessel. The reactants are homogeneously admixed and uniformly heated. When the contents of the reaction vessel reach about 138°C., the diphenyl sulfone melts and serves as a solvent for the condensation reactants.

The polymer product exhibits substantially identical properties.

Although the invention has been described with preferred embodiments, it is to be understood that variations and modifications may be resorted to as will be apparent to those skilled in the art. Such variations and modifications are to be considered within the purview and scope of the claims appended hereto.

We claim:
1. In a process for forming a BBB type polymer comprising condensing with intimate admixture
  a. at least one organic tetra-amine having the structural formula

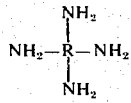

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached, and
  b. at least one tetracarboxylic acid or its corresponding half anhydride or dianhydride having the structural formula

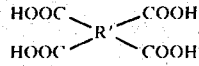

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached; the improvement of conducting said condensation with agitation at a temperature of about 300° to 450°C. in the presence of a major concentration of a liquid aryl sulfone which is inert under the reaction conditions, with said BBB type polymer upon formation assuming the configuration of a particulate solid having an unusually high surface area of 100 to 500 square meters per gram and an inherent viscosity of at least 0.2 dl./gram.

2. A process according to claim 1 wherein said organic tetra-amine and said tetracarboxylic acid or its corresponding half anhydride or dianhydride are provided in substantially stoichiometric concentrations.

3. A process according to claim 1 wherein said BBB type polymer is a condensation product of 3,3'-diamino benzidine and 1,4,5,8-naphthalene tetracarboxylic acid.

4. A process according to claim 1 wherein said condensation is conducted at substantially atmospheric pressure.

5. A process according to claim 1 wherein said liquid aryl sulfone possesses a boiling point in excess of the reaction temperature and is a solvent for said condensation reactants and a non-solvent for said BBB type polymer product at the reaction temperature.

6. A process according to claim 1 wherein said liquid aryl surfone is selected from the group consisting of diphenyl sulfone, 4,4' ditolyl sulfone and methylphenyl sulfone.

7. A process according to claim 1 wherein said condensation reactants are provided in a total concentration of about 5 to 25 percent by weight based upon total weight of said condensation reactants and said sulfone.

8. A process according to claim 1 wherein a low boiling organic solvent for said condensation reactants and for said aryl sulfone having a boiling point below about 200°C. and which is inert to said condensation reactants and said aryl sulfone initially is provided in admixture therewith prior to raising the temperature of said condensation reactants to said reaction temperature with said low boiling organic solvent being substantially volatilized prior to said condensation reactants reaching said reaction temperature.

9. A process according to claim 8 wherein said low boiling organic solvent is provided in a concentration of about 20 to 70 percent by weight based upon the total weight of said condensation reactants.

10. A process according to claim 1 wherein said condensation reactants are maintained at a temperature of about 300° to 450°C. for about 2.5 to 5 hours.

11. In a process for forming poly(bisbenzimidazobenzophenanthroline) comprising condensing with intimate admixture substantially stoichiometric amounts of (1) 3,3'-diamino benzidine and (2) 1,4,5,8-naphthalene tetracarboxylic acid; the improvement of conducting said condensation with agitation while at substantially atmospheric pressure and at a temperature of about 325° to 420°C. in the presence of a major concentration of a liquid aryl sulfone selected from the group consisting of diphenyl sulfone, 4,4'-ditolyl sulfone and methylphenyl sulfone, with said condensation reactants being provided in a total concentration of about 5 to 25 percent by weight based upon the total weight of said condensation reactants and said sulfone and with said BBB type polymer upon formation assuming the configuration of a particulate solid having an unusually high surface area of 100 to 500 square meters per gram and an inherent viscosity of about 0.4 to 2.5 dl./gram.

12. A process according to claim 11 wherein said sulfone is diphenyl sulfone and said condensation is carried out at a temperature of about 350° to 380°C.

13. A process according to claim 11 wherein a low boiling organic solvent for said condensation reactants and said aryl sulfone having a boiling point below about 200°C. and which is inert to said condensation reactants and said aryl sulfone initially is provided in admixture therewith prior to raising the temperature of said condensation reactants to said reaction temperature with said low boiling organic solvent being substantially volatilized prior to said condensation reactants reaching said reaction temperature.

14. A process according to claim 13 wherein said low boiling organic solvent is selected from the group consisting of para-xylene, chlorobenzene, and cumene.

15. A process according to claim 13 wherein said low boiling organic solvent is provided in a concentration of about 35 to 65 percent by weight based upon the total weight of said condensation reactants.

16. Particulate BBB type polymer having a surface area of about 200 to 350 square meters per gram formed in accordance with the process of claim 1.

* * * * *